United States Patent [19]
Makara

[11] 3,968,837
[45] July 13, 1976

[54] SOUND ABSORBING RADIATING SCREEN

[75] Inventor: Gyorgy Makara, Budapest, Hungary

[73] Assignee: "Futober" Epuletgepeszeti Termekeket Gyarto Vallalat, Budapest, Hungary

[22] Filed: Aug. 30, 1974

[21] Appl. No.: 502,144

[52] U.S. Cl. ................................ 165/135; 52/145; 62/296; 62/DIG. 1; 165/49; 165/57; 181/33 G
[51] Int. Cl.² ..................... F24H 9/08; F28F 13/00
[58] Field of Search ............... 165/135, 49, 56, 57, 165/53; 62/296, DIG. 1; 52/145; 181/33 G

[56] References Cited
UNITED STATES PATENTS

| | | | |
|---|---|---|---|
| 1,913,249 | 6/1933 | Sersen | 52/145 |
| 1,982,931 | 12/1934 | Schank et al. | 165/135 X |
| 2,710,175 | 6/1955 | Jorn | 165/56 |
| 2,729,431 | 1/1956 | Little | 181/33 G |
| 2,800,308 | 7/1957 | Parkinson et al. | 165/56 |
| 3,072,183 | 1/1963 | Barbier et al. | 181/33 G |
| 3,861,493 | 1/1975 | Payne | 181/33 G |

FOREIGN PATENTS OR APPLICATIONS

1,459,563  11/1966  France ........................... 52/145

*Primary Examiner*—Albert W. Davis, Jr.
*Assistant Examiner*—Sheldon Richter
*Attorney, Agent, or Firm*—Karl F. Ross; Herbert Dubno

[57] ABSTRACT

The invention relates to a sound-absorbing radiating screen. One side of the screen is coated with a heat-insulating material, whereas on the other side perforations of optional shape are formed. The entire curve, or a part thereof, formed by the edge limiting the rims of the openings lay outside the unperforated surface of the plate of the screen.

The sound-absorbing capacity of the radiating screen is increased and at the same time, the punching and perforation does not impede or interrupt the heat flow in the screen.

1 Claim, 3 Drawing Figures

SOUND ABSORBING RADIATING SCREEN

FIELD OF THE INVENTION

The invention relates to a sound-absorbing radiating screen, in which one side of the plate of the screen is covered with heat-insulating material. The air space on the side not covered with heat insulation of the screen is in direct contact with the side of the heat-insulating material turned toward the plate. The sound waves arriving at the heat-insulating material through an orifice are fully or partly absorbed by the heat-insulating material and the screen thus reduces the noisiness of heated or cooled rooms (e.g. industrial hall).

BACKGROUND OF THE INVENTION

Several variants of radiating screens are known in practice. Thus the radiating screens produced by the West German firm Baufa consists of steel plates of suitable profile to which seamless steel pipes are welded in such manner that the heat transferred by the heating or cooling liquid flowing in the steel pipes, which fit into profiles of the plate is transferred through the plate by radiation into the adjacent space.

The sound-absorbing capacity of these radiating screens can be increased in halls of high noise level to be heated or cooled. The increase of the sound-absorbing capacity is achieved with holes bored in the plates, or with otherwise perforated the plates by coating the top side with heat-insulating and sound-absorbing material. Such radiating screens have the drawback that the perforations interrupt the screen plate perpendicularly to the heat flow and thereby reduce the heating and cooling capacity.

OBJECT OF THE INVENTION

The aim of the invention is the development of a sound-absorbing radiating heating-cooling body, which, while eliminating the above-mentioned drawbacks, permits radiation over the entire surface and at the same time, provides for a maximum sound absorption.

SUMMARY OF THE INVENTION

The object set aim is achieved by a radiating heating-cooling body, in which the plate of the radiating screen is formed with perforations and openings, in such manner that the entire curve limiting the rim of the opening, or a part thereof, falls outside the unperforated plane of the plate. Through these openings (perforations) the air from the space on the side of the plate not provided with heat insulation comes into direct contact with the side of the heat-insulating material turned toward the plate, and the heat-insulating (and sound-proof) material absorbs the sound waves, or a part thereof, arriving at the heat-insulating material through the orifices, reducing thereby the noisiness of the room heated or cooled by the radiating screen.

BRIEF DESCRIPTION OF THE DRAWING

The invention will be now described more in connection with an advantageous embodiment, referring to the enclosed drawing, where.

SPECIFIC DESCRIPTION

Figure 1:
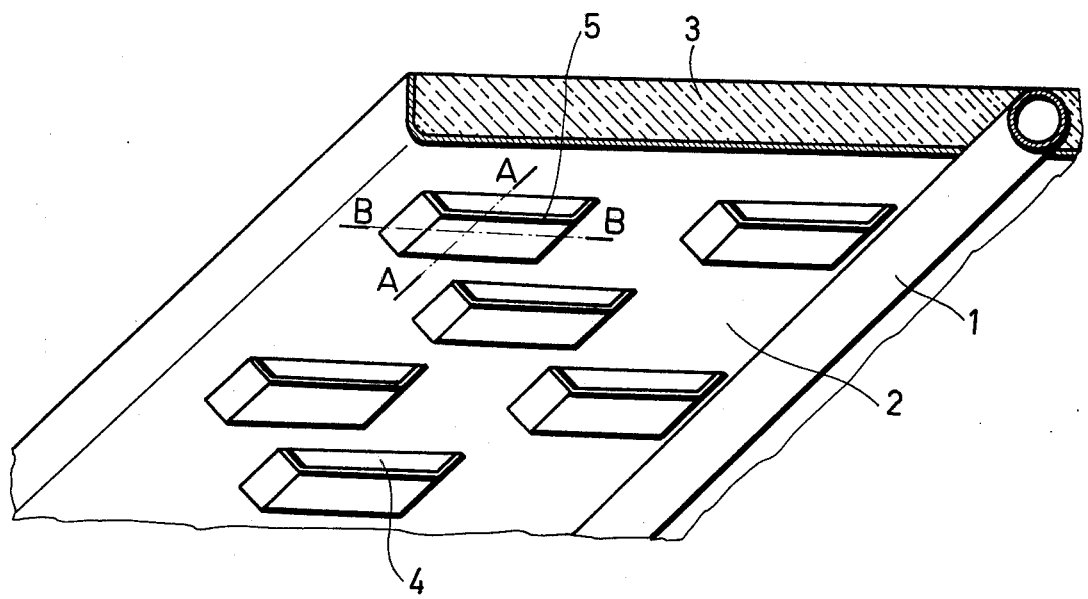
FIG. 1 shows a detail of the radiating screen.
Figure 2:
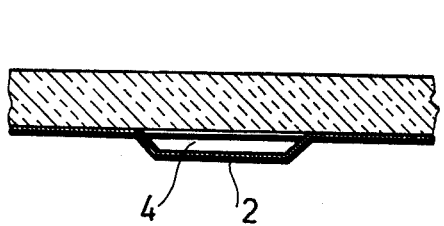
FIG. 2 is the section B according to FIG. 1.
Figure 3:
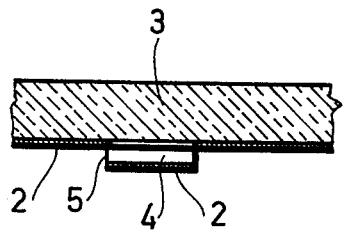
FIG. 3 illustrates the section A according to FIG. 1.

The radiating screen is a heating or cooling body, consisting of a pipe or pipes 1, of plate 2 fastened mechanically, or by welding or by glueing to the pipe(s) and of the heat insulator 3 arranged on one - generally on the upper - side of the plate 2. The heat-carrying agent, which may be warm water, hot water, water steam, oil, aqueous solution of salts, etc., flows in the pipe 1 and carries out a heat exchange with the ambient space through the plate 2 serving as radiating screen, as through a heat exchanger, that is, it heats or cools the ambient space. Because of the heat insulation, the heat exchange between the environment and the radiating screen occurs mostly on the surface not contacting the heat insulation of the pipes 1 and the plate 2, partly in the form of convective heat-transfer and partly as radiating heat transfer.

The plate 2 of the radiating screen is provided with openings 4 such that the entire edge 5 or, a part thereof limiting the rim(s) of openings 4 falls outside the unperforated plane of the plate.

It has been stated that, as compared to the punching perforation known and used in itself, the above described particular punching method ensures several advantages. Thus, the openings providing for the sound absorption can be developed without the reduction of the surface participating in the heat transfer and of the heat output of the plate 2. As can be seen from the drawing, the formation of the openings 4 in the plane of the plate 2 results in the bending of the punches-out material in the configuration of a trapezoidal shield having a wall spaced from the plane of the plate and overlying the opening with a pair of webs extending inclinedly from this wall to the plane of the plate. Trapezoidal slots affording access to the opening are thus framed by the web and the wall.

What we claim is:
1. A radiant heat-transfer body comprising a plate of heat conductive material lying substantially in a plane and formed with a multiplicity of spaced apart generally rectangular openings; at least one pipe for a heat-transfer fluid bonded to said plate and in heat conducting relationship therewith; a body of thermally insulated and heat absorptive in contact with one side of said plate and substantially coextensive therewith, said body being exposed at said openings; and respective walls spaced from the opposite side of said plate and overlying each of said openings parallel to the plane of the plate, and respective webs on opposite ends of each of said walls connecting same with said plate along opposite edges of each respective opening whereby the webs and wall at each opening frame a pair of slots opening laterally between each wall and the body of insulating material, said slots opening in directions perpendicular to the longitudinal dimension of said pipe.

* * * * *